United States Patent
Beier et al.

(10) Patent No.: US 9,677,422 B2
(45) Date of Patent: Jun. 13, 2017

(54) JET ENGINE COMPRISING A DEVICE FOR SPRAYING OIL INTO AN AIR-OIL VOLUME FLOW

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 232 days.

(21) Appl. No.: 14/532,772

(22) Filed: Nov. 4, 2014

(65) Prior Publication Data

US 2015/0135660 A1 May 21, 2015

(30) Foreign Application Priority Data

Nov. 19, 2013 (DE) .................. 10 2013 112 773

(51) Int. Cl.
| | |
|---|---|
| B01D 45/16 | (2006.01) |
| F02C 7/32 | (2006.01) |
| F01M 11/03 | (2006.01) |
| F01D 25/18 | (2006.01) |
| B01D 47/06 | (2006.01) |
| F02C 3/30 | (2006.01) |
| F02C 7/06 | (2006.01) |

(Continued)

(52) U.S. Cl.
CPC ............ *F01D 25/18* (2013.01); *B01D 45/12* (2013.01); *B01D 47/06* (2013.01); *F02C 3/30* (2013.01); *F02C 7/06* (2013.01); *B01D 46/0086* (2013.01); *B01D 46/429* (2013.01); *F05D 2210/13* (2013.01); *F05D 2260/609* (2013.01); *F05D 2260/98* (2013.01)

(58) Field of Classification Search
CPC .......... F02C 3/30; F02C 7/06; F05D 2260/98; F05D 2260/609; F01D 25/18; B01D 45/12; B01D 46/0086; B01D 46/429; B01D 47/06
See application file for complete search history.

(56) References Cited

U.S. PATENT DOCUMENTS

| 4,342,489 A | 8/1982 | Lenz et al. |
| 2003/0039421 A1 | 2/2003 | Fisher et al. |

(Continued)

FOREIGN PATENT DOCUMENTS

WO WO2013168232 A1 11/2013

OTHER PUBLICATIONS

European Search Report dated Apr. 9, 2015 for related European Application No. 14190227.0.

(Continued)

*Primary Examiner* — William E Dondero
*Assistant Examiner* — Robert T Reese
(74) *Attorney, Agent, or Firm* — Shuttleworth & Ingersoll, PLC; Timothy J. Klima

(57) ABSTRACT

The present invention describes a jet engine with a device for spraying oil into an air-oil volume flow guided inside a flow cross-section limited by a wall area. The air-oil volume flow is guidable through an oil separator in order to separate the oil. In accordance with the invention, the oil can be sprayed into the air-oil volume flow in the area of the device via an outlet area designed movable relative to the wall area.

15 Claims, 6 Drawing Sheets

Figure 1A:
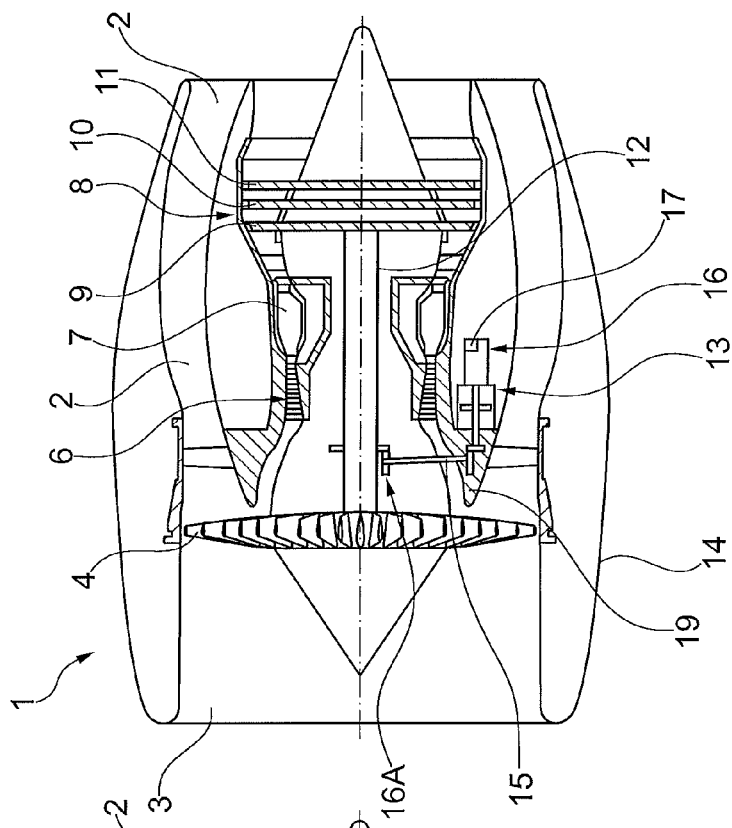

(51) Int. Cl.
  *B01D 45/12* (2006.01)
  *B01D 46/00* (2006.01)
  *B01D 46/42* (2006.01)

(56) References Cited

U.S. PATENT DOCUMENTS

| | | |
|---|---|---|
| 2009/0133581 A1 | 5/2009 | Fang et al. |
| 2009/0134243 A1 | 5/2009 | Mount et al. |
| 2011/0188992 A1 | 8/2011 | Fintescu et al. |
| 2014/0326225 A1* | 11/2014 | Shioda ............... F02C 6/12 123/559.1 |
| 2015/0135663 A1* | 5/2015 | Beier ............... B01D 45/14 55/461 |
| 2015/0136096 A1 | 5/2015 | Shioda |
| 2015/0321130 A1* | 11/2015 | Beier ............... B01D 45/16 96/306 |

OTHER PUBLICATIONS

German Search Report dated Mar. 20, 2014 from counterpart app No. 10 2013 112 773.8.

* cited by examiner

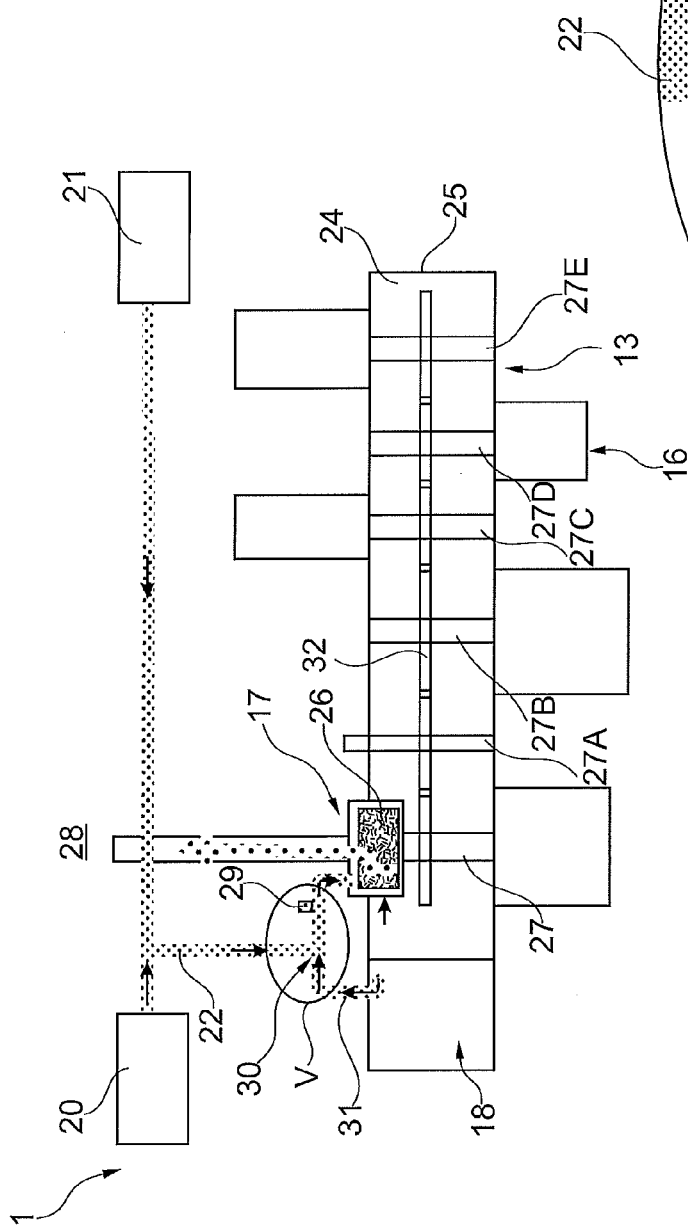
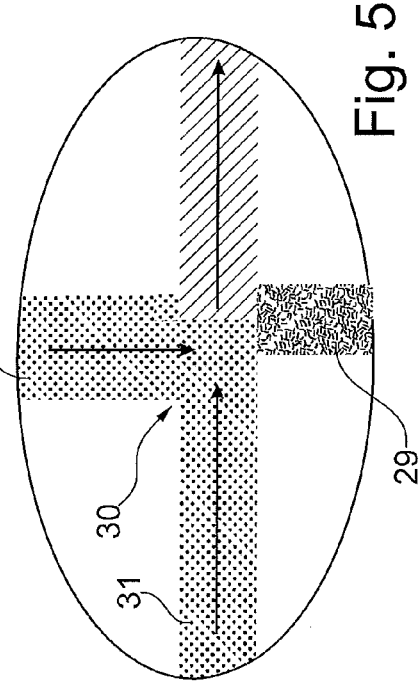

JET ENGINE COMPRISING A DEVICE FOR SPRAYING OIL INTO AN AIR-OIL VOLUME FLOW

This application claims priority to German Patent Application DE102013112773.8 filed Nov. 19, 2013, the entirety of which is incorporated by reference herein.

This invention relates to a jet engine with a device for spraying oil into an air-oil volume flow guided inside a flow cross-section limited by a wall area.

From the unpublished specification DE 10 2013 106 879.0 of the applicant, a jet engine with at least one oil separator is known, through which an air-oil volume flow can be guided out of at least one area supplied with oil for separating the oil. The jet engine is provided with a device for spraying oil into the air-oil volume flow. A defined oil spray jet is preferably directly introduced into the air-oil volume flow using the device. When sprayed-in oil droplets meet oil droplets already present in the air-oil volume flow, the sprayed-in oil droplets and the already present oil droplets combine to form larger drops, which is desirable, due to their forces of attraction, said drops being mechanically separable from the air in the further flow path of the air-oil volume flow with less effort than oil particles of smaller diameter. The device is designed with an oil nozzle, said oil nozzle being configured such that during spraying of oil into the air-oil volume flow flowing in the direction of the oil separator, oil drops are generated which are mostly larger than those oil drops that cannot be filtered out in a porous area of the oil separator due to their size.

The object underlying the present invention is to provide a jet engine with a device for spraying in oil that is simply designed and can be implemented into existing engine systems with low effort.

It is a particular object to provide a solution to the above problems by a jet engine having features as described herein.

The jet engine in accordance with the invention is provided with a device for spraying oil into an air-oil volume flow guided inside a flow cross-section limited by a wall area, said air-oil volume flow being guidable through an oil separator in order to separate the oil.

The oil can be sprayed into the air-oil volume flow in the area of the device by a simply designed method via an outlet area designed movable relative to the wall area, so that existing jet engine systems too can be designed with little effort with a device for spraying in oil.

In an embodiment of particularly simple design of the jet engine in accordance with the invention, the outlet area can be supplied with oil via a hole of a feed area passing through the wall area substantially in the radial direction.

If the feed area has at least one element projecting in the radial direction from the wall area into the flow cross-section of the air-oil volume flow and containing an oil guide duct connected to the hole, the oil can be sprayed into the air-oil volume flow in an area of the flow cross-section at a distance from the wall with a required degree of distribution.

If the feed area includes at least one further element rotatably connected to the projecting element and inside which a further oil guide duct connected to the oil guide duct is provided, the degree of distribution of the oil in the air-oil volume flow can be further improved with little design effort by the rotary movement of the further element.

The rotary movement of the further element relative to the projecting element can be initiated with little force applied when a pivot bearing, preferably a plain bearing, is provided between the projecting element and the further element.

If the further element extends in the radial direction in the flow cross-section of the air-oil volume flow and if it is provided, in the area of its side facing away from the flow direction of the air-oil volume flow, with at least one hole of the outlet area issuing into the flow cross-section of the air-oil volume flow, the oil can be sprayed into the air-oil volume flow at least approximately in the flow direction of the latter, so that a spraying angle of the oil into the air-oil volume flow directly in the opening area of the feed area can be set substantially unaffected by the air-oil volume flow.

If a surface of the further element facing the air-oil volume flow relative to the flow direction of the latter is designed at least in some areas with a slope, using which the inner energy of the air-oil volume flow can be transformed into a mechanical drive energy triggering a rotary movement of the further element, the rotary drive of the further element is achieved without additional motor devices.

The oil can, in a further advantageous embodiment of the jet engine in accordance with the invention, be introduced with a high degree of distribution into the air-oil volume flow if the further element is rotatably connected to the projecting element substantially in the centre of the flow cross-section of the air-oil volume flow and includes, starting at the rotary connection to the projecting element, partial arm areas, each extending radially in the direction of the wall limiting the flow cross-section.

If the partial arm areas are each designed with a slope, said slopes being designed mirror-inverted to one another, the further element is set into rotation by an onflow of the air-oil volume flow to the required extent without a motor device.

A degree of distribution of the oil to be introduced into the air-oil volume flow can be optimally set to the respective application with little effort if the oil sprayable out of the outlet area into the air-oil volume flow can be imparted with a flow direction in the outlet area, said flow direction forming an acute angle, i.e. an angle ranging from 0° to 90°, with the main flow direction of the air-oil volume flow in the area of the device.

For setting a required degree of distribution of the oil in the air-oil volume flow, a nozzle device can be provided in the opening area of the hole of the outlet area, in the area of which device the oil to be supplied can preferably be turned into mist.

If the outlet area includes several holes, at a distance from one another in the radial direction of the flow cross-section of the air-oil volume flow and each issuing into the flow cross-section, the oil can be sprayed into the air-oil volume flow preferably over the entire radial area of the flow cross-section in the zone of several opening areas and can be introduced with a high degree of distribution into the air-oil volume flow.

In a simply designed embodiment of the jet engine favourable in terms of installation space, the holes of the further element are connected to one another via the oil guide duct.

The separation capacity in the area of an oil separator can, in a development of the jet engine in accordance with the invention, be improved by the device of the jet engine having in the flow direction of the air-oil volume flow several areas for spraying in oil at a distance from one another, since droplet diameters of oil borne along in the air-oil volume flow can be adjusted or enlarged to the required extent in the area of several oil entry points one behind the other in the flow direction of the air-oil volume flow.

Both the features stated in the patent Claims and the features stated in the following exemplary embodiments of the jet engine in accordance with the invention are each suitable, singly or in any combination with one another, to develop the subject matter of the invention. The respective feature combinations do not represent any restriction with regard to the development of the subject matter in accordance with the invention, but have substantially only exemplary character.

Further advantages and advantageous embodiments of the jet engine will become apparent from the present description and the exemplary embodiments described in principle in the following with reference to the accompanying drawing, where in the description of the various exemplary embodiments the same reference numerals are used for components of identical design and function for greater clarity.

Figure 1B:
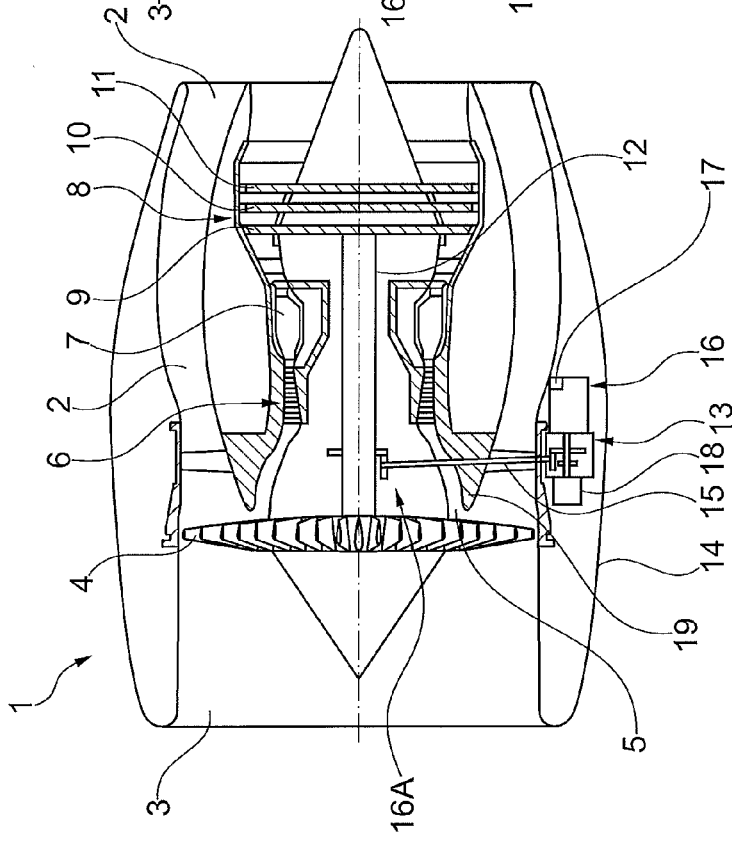
Figure 2:
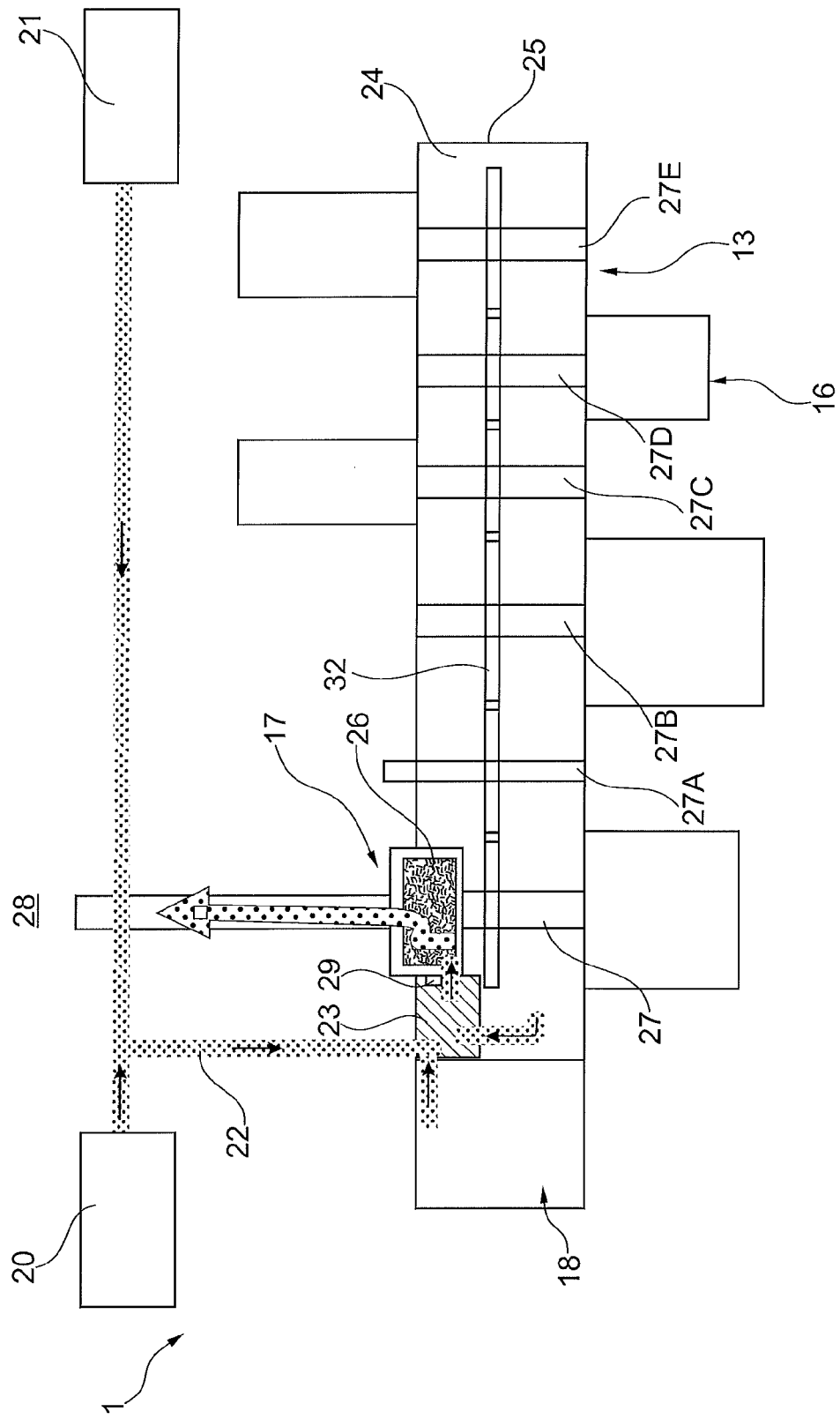
Figure 3:
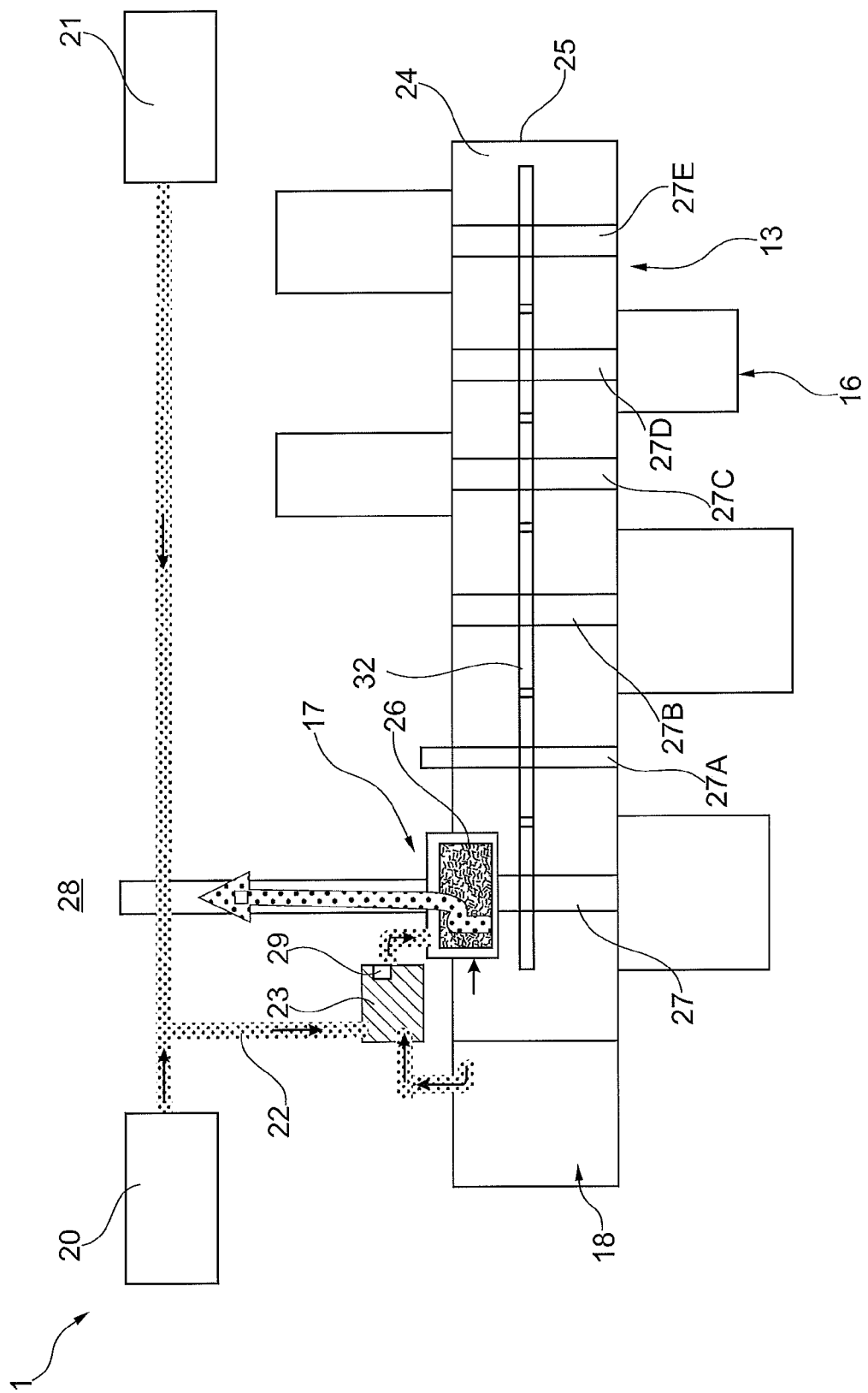
Figure 6:
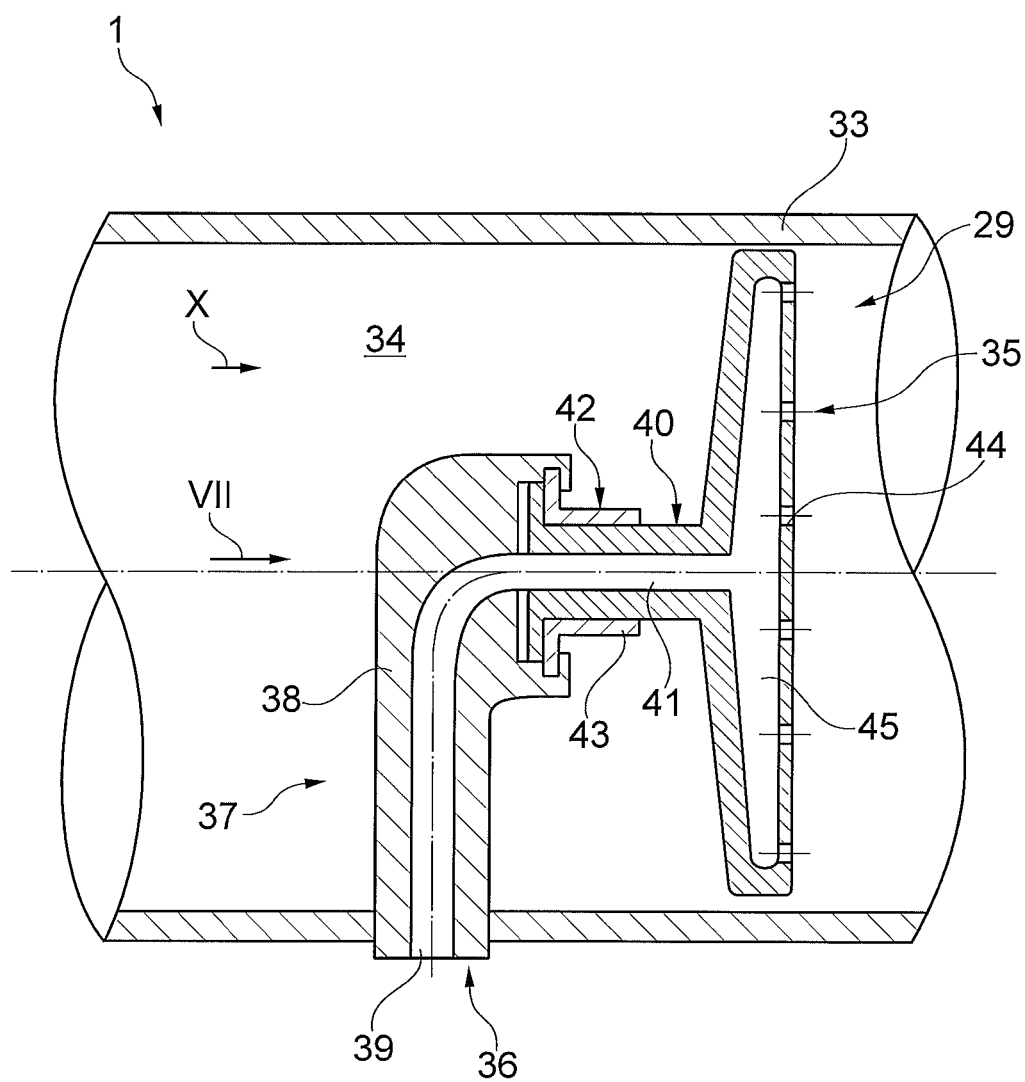
Figure 7:
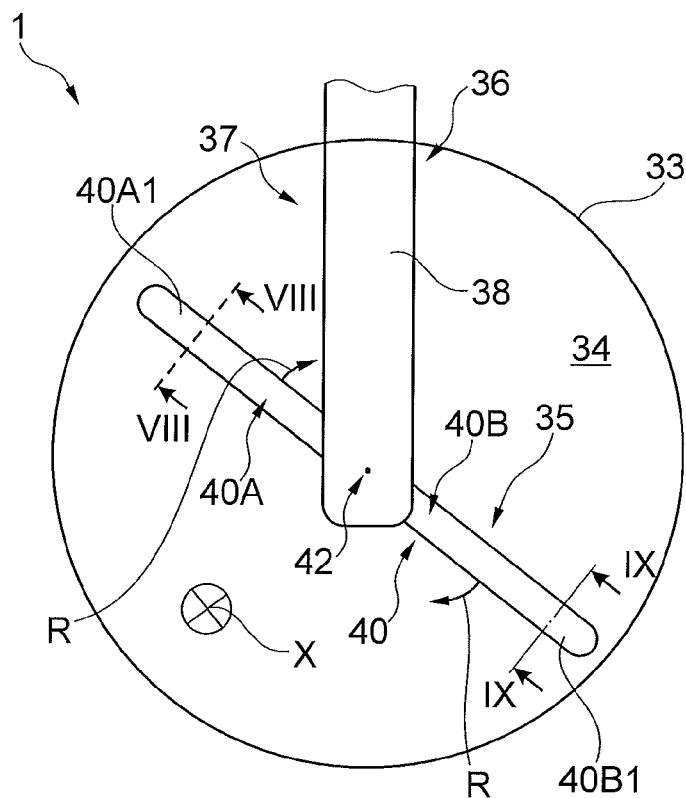
Figure 9:
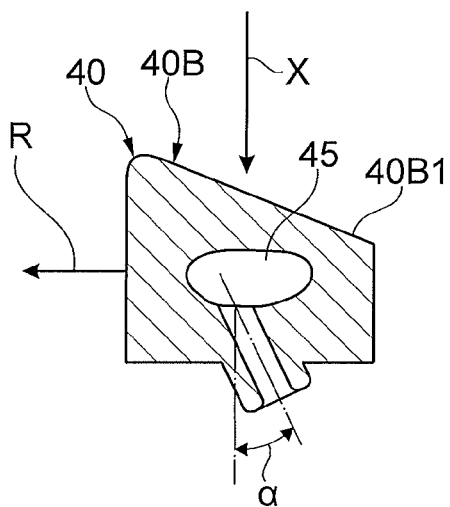
Figure 8:
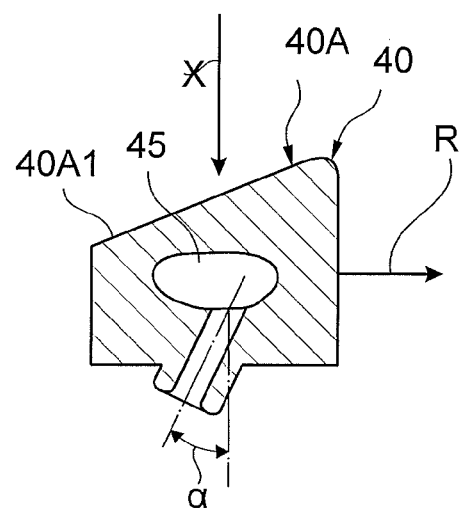

In the drawing,

FIG. 1a shows a highly schematized longitudinal sectional view of a jet engine with an accessory gearbox arranged in the fan casing, FIG. 1b shows a representation—corresponding to FIG. 1a—of a jet engine with an accessory gearbox mounted in the area of the engine core, FIG. 2 shows a highly schematized partial representation of the jet engine according to FIG. 1a or FIG. 1b with an oil separator arranged in the area of the accessory gearbox, and associated pre-chamber provided in a casing of the accessory gearbox, FIG. 3 shows a representation—corresponding to FIG. 2—of an embodiment—departing from FIG. 2—of the jet engine according to FIG. 1a or FIG. 1b with a pre-chamber arranged outside a casing of the accessory gearbox, FIG. 4 shows a highly schematized partial representation of the jet engine according to FIG. 1a or FIG. 1b with a device for spraying oil into an air-oil volume flow arranged upstream of the oil separator, FIG. 5 shows an enlarged representation of an area V shown in more detail in FIG. 4, FIG. 6 shows a detailed cross-sectional view of an embodiment of the device for spraying oil into an air-oil volume flow, FIG. 7 shows the device for spraying in oil in accordance with FIG. 6 from a view VII shown in more detail in FIG. 6, FIG. 8 shows a sectional view of the device for spraying in oil in accordance with FIG. 6 along a sectional plane VIII-VIII shown in more detail in FIG. 7, and FIG. 9 shows a representation—corresponding to FIG. 8—of the device for spraying in oil in accordance with FIG. 6 along a sectional plane IX-IX shown in more detail in FIG. 7.

FIGS. 1a and 1b each show a jet engine 1 in a longitudinal sectional view. The jet engine 1 is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the jet engine 1 according to FIG. 1a, an accessory gearbox 13 is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and an oil separator 17, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the jet engine 1 such as bearing devices, gear pairings of the inner gearbox 16A and of the accessory gearbox 13, and further assemblies of the jet engine 1 that are to be cooled and lubricated.

In contrast to this, the accessory gearbox 13 with the auxiliary units 16 and the oil separator 17 is arranged, in the design of the jet engine 1 according to FIG. 1b, in the radial direction between the bypass duct 2 and the engine core 5 in a component 19 delimiting both the bypass duct 2 and the engine core 5.

FIG. 2 to FIG. 4 show three different embodiments of the jet engine 1 according to FIG. 1a in a highly schematized form in the area of the accessory gearbox 13, the auxiliary units 16 and the oil separator 17, the latter being in the present invention in operative connection to the oil tank 18 and two further areas 20, 21 designed here as bearing chambers of the jet engine 1 and supplied during operation of the jet engine 1 with oil from the oil tank 18 for lubrication and cooling. The area 20 here represents the bearing chamber of the front bearing and the area 21 the bearing chamber of the rear bearing of the jet engine 1. The jet engine 1 according to FIG. 1b shows the aspects described in more detail with reference to FIG. 2 to FIG. 4 to a substantially identical extent.

In the embodiment of the jet engine 1 shown in FIG. 2, air-oil volume flows from the front bearing chamber 20 and from the rear bearing chamber 21 can each be guided in the direction of a line section 22, which in the present invention issues into a pre-chamber 23 upstream of the oil separator 17. Furthermore, the oil tank 18 too in the present invention is connected to the pre-chamber 23, to allow introduction of an air-oil volume flow from the oil tank 18 and of the air-oil volume flows from the bearing chambers 20 and 21 tangentially into the pre-chamber via the line section 22. Furthermore an interior 24 of a casing 25 of the accessory gearbox 13 is linked to the pre-chamber 23, where an air-oil volume flow from the casing 25 of the accessory gearbox 13 is introduced tangentially into the pre-chamber 23 when appropriate pressure is applied to the interior 24. The pre-chamber 23 is connected to the oil separator 17, in the interior of which a porous area 26 is rotatably arranged that can be passed by the air-oil volume flow flowing out of the pre-chamber 23.

It is possible here for the pre-chamber 23 to be designed as a tube or tube section provided with a widened internal diameter and acting as the line which carries the air-oil volume flow.

The porous area 26 can in the present invention be driven by the accessory gearbox 13 via a gear 27 and acts as a centrifuge in order to reduce as far as possible the proportion of oil in the air-oil volume flow flowing through the porous area 26. The proportion of oil of the air-oil volume flow in the oil separator 17 is here reduced in the zone of the porous area 26 by separation of the oil from the air, on the one hand as when flowing through an impingement filter and on the other hand as in the area of a centrifuge, due to the rotation of the porous area 26. The oil filtered out of the air-oil volume flow in the zone of the porous area 26 is extracted in the outer area of the oil separator 17, in a manner not shown in detail, via a pump device and returned to the oil tank 18. The air flowing out of the oil separator 17 in the direction of the environment 28 has only a low oil load. The gear 27 is, in addition to further gears 27A to 27E, non-rotatably connected to a gear shaft 32 and arranged in the interior 24 of the accessory gearbox 13.

To enable the oil load of the air volume flow flowing-off in the direction of the environment 28 to be set as low as possible, in the present invention a device 29 is provided in the area of the transition between the pre-chamber 23 and the oil separator 17, by means of which oil is sprayed into the air-oil volume flow flowing from the pre-chamber 23 in the direction of the oil separator 17 with a defined droplet size. To do so, the device 29 is designed such that during spraying of oil into the air-oil volume flow flowing in the direction of the oil separator 17, oil drops are generated which are mostly larger than those oil drops that cannot be filtered out in the porous area 26 due to their small size.

Also upstream of the device 29, a deflection area is provided in the area of the pre-chamber 23 for the air-oil volume flows passed out of the interior 24 and out of the oil tank 18 into the pre-chamber 23 via the line section 22, in which deflection area at least part of the oil is separated from the air-oil volume flows of the bearing chambers 20 and 21, the interior 24 and the oil tank 18 by the centrifugal force acting in the deflection area. As a result, the oil load of the air-oil volume flow is already reduced in the deflection area of the pre-chamber 23 by filtering out larger droplets, which have a greater inertia than oil particles with smaller diameters.

Subsequently, the smaller droplets still present in the air-oil volume flow flowing out in the direction of the oil separator 17 from the pre-chamber 23 are enlarged by spraying in oil via the device 29, which is favoured by the forces of attraction prevailing in each case between the individual oil droplets. If the air-oil volume flow enriched with oil flows through the oil separator 17 and its porous area 26, which rotates accordingly during operation of the jet engine 1, a further substantial proportion of the oil present in the air-oil volume flow is hurled outwards and then extracted from the oil separator 17 in the direction of the oil tank 18. The oil particles now enlarged by washing out the oil can be separated from the metal foam 26 in the breather 17 substantially more efficiently, by spraying in oil, so that oil losses of the jet engine 1 in the direction of the environment 28 are minimized by the reduced emissions.

Alternatively to the above description, it is also possible that by means of the device 29 arranged upstream of the deflection area of the pre-chamber 23, acting as a centrifuge, in the area of the bearing chambers and/or in the area of exhaust air suction points, oil is introduced into one or several air-oil volume flows in the jet engine 1, and that the larger drops forming in the air-oil volume flow downstream of the device 29 due to the combination of the oil droplets are separated in the deflection area of the pre-chamber 23 due to the effect of the centrifugal force. The further separation process previously described then takes place in the rotating porous area 26 of the oil separator 17, before the air flowing out of the oil separator 17 is discharged in the direction of the environment 28 with only a small load of oil.

It is furthermore also possible that oil is already introduced into one or more air-oil volume flows via the device 29 in the bearing chambers or in the interior of further consumers of sealing air, such as the inner gearbox of the jet engine 1, and that the larger drops forming in the air-oil volume flow downstream of the device 29 due to the combination of the oil droplets are separated in the deflection area of the pre-chamber 23 due to the effect of the centrifugal force. The further separation process previously described then takes place in the rotating porous area 26 of the oil separator 17, before the air flowing out of the oil separator 17 is discharged in the direction of the environment 28 with only a small load of oil.

With the design according to FIG. 2, the pre-chamber 23 is completely integrated into the casing 25 of the accessory gearbox 13, while the oil separator 17 engages at least in some areas in the interior 24 of the accessory gearbox 13.

In contrast to this, the pre-chamber 23 in the design of the jet engine 1 according to FIG. 3 is arranged completely outside the casing of the accessory gearbox 13, while the oil separator 17 is arranged, to the same extent as in the design of the jet engine 1 according to FIG. 2, inside the casing 25 in some areas. As in the design of the jet engine 1 according to FIG. 2, in the jet engine 1 according to FIG. 3 too, the air-oil volume flows out of the bearing chambers 20 and 21, the oil tank 18 and the interior 24 of the accessory gearbox 13 are initially introduced tangentially into the pre-chamber 23 and passed on via the deflection area in the direction of the device 29, in the area of which oil is again sprayed into the collected air-oil volume flow. Then the oil-enriched air-oil volume flow is introduced into the oil separator 17 and flows there through the porous area 26.

The jet engine 1 according to FIG. 4 is, in contrast to this, designed without the pre-chamber 23 and can be used for—among other things—a jet engine, the oil tank of which is not integrated into the accessory gearbox 13 and is preferably arranged inside an installation space at a distance from the accessory gearbox 13 inside the jet engine. The oil-enriched air-oil volume flows in the area of the bearing chambers 20 and 21 and in the area of the oil tank 18 are introduced—downstream of a line section node 30, into the area of which the line section 22 and a further line section 31 connected to the oil tank 18 discharge—into the deflection area, in which part of the oil from the combined air-oil volume flow is separated. Again downstream of the deflection device, oil is sprayed by the device 29 into the air-oil volume flow flowing off from the line section node 30, as shown in highly schematic form in FIG. 5. The washed air-oil volume flow flows with larger oil drops into the oil separator 17, in which the oil is separated in the zone of the rotating porous area 26 in the manner previously described. In addition, the air-oil volume flow from the interior 24 of the accessory gearbox 13 is introduced tangentially and directly into the oil separator 17, in order to clean to the required extent the consumed air loaded with oil and flowing out of the pressurized casing 25 in the area of the oil separator 17.

FIG. 6 shows a cross-sectional view of an embodiment of the device 29 for spraying oil into the air-oil volume flow, which is guided inside a flow cross-section 34 limited by a wall area 33, of the bearing chambers 20 and 21, of the oil tank 18 and preferably also of an air-oil volume flow from the interior 24 of the accessory gearbox 13. The device 29 is provided with an outlet area designed movable relative to the wall area 33 and via which oil can be sprayed into the air-oil volume flow. The outlet area 35 can be supplied with oil via a hole 36 of a feed area 37 passing through the wall area 33 substantially in the radial direction. The feed area 37 has an element 38 projecting into the flow cross-section 34 of the air-oil volume flow starting at the wall area 33 in the radial direction, in which element runs an oil guide duct 39 connected to the hole 36. Furthermore, the feed area 37 includes at least one further element 40 rotatably connected to the projecting element 38 and in which is provided a further oil guide duct 41 connected to the oil guide duct 39.

A pivot bearing 42 is provided between the projecting element 38 and the further element 40 which in the present invention is designed as a plain bearing. The pivot bearing 42 includes a sliding bush 43 arranged between the projecting element 38 and the further element 40, said bush absorbing bearing forces in both the radial and the axial directions and permitting a rotary movement of the further element 40 relative to the projecting element 38 firmly connected to the wall 33 with low dynamic frictional forces. The further element 40 extends in the radial direction in the flow cross-section 34 of the air-oil volume flow and is provided in the area of its side facing away from the flow direction X of the air-oil volume flow with several holes 44 of the outlet area 35 which issue into the flow cross-section 34 of the air-oil volume flow.

FIG. 7 illustrates the device 29 from a view VII shown in more detail in FIG. 6. It can be seen from the illustration according to FIG. 7 that the further element 40 is rotatably connected to the projecting element 38 substantially in the centre of the flow cross-section 34 of the air-oil volume flow and starting at the rotary connection to the projecting element 38 includes partial arm areas 40A, 40B, each extending radially in the direction of the wall area 33 limiting the flow cross-section. The partial arm areas 40A and 40B are, as shown in FIG. 8 and FIG. 9, each provided with a slope 40A1 and 40B1 respectively, which are designed mirror-inverted to one another. By providing the surface of the further element 40 facing the air-oil volume flow relative to the flow direction X of said air-oil volume flow with the slopes 40A1 and 40B1, the inner energy of the air-oil volume flow is transformed into a mechanical drive energy triggering a rotary movement of the further element 40, where the sense of rotation resulting from the slopes 40A1 and 40B1 and the flow velocity of the air-oil volume flow are indicated in more detail in the drawing under the reference letter R.

The holes 44 of the further element 40 are in the present invention arranged at an acute angle α relative to the flow direction X of the air-oil volume flow in the flow cross-section 34 with an oblique course in the further element 40. This enables a flow direction in the outlet area 35 to be imparted to the oil sprayable out of the outlet area 35 into the air-oil volume flow, said flow direction forming an acute angle with the main flow direction X of the air-oil volume flow in the area of the device 29, to achieve, as required, a high degree of distribution of the oil in the air-oil volume flow and additionally to impart an angular momentum to the further element 40 by the exit of the oil.

The axial forces acting on the further element 40 and resulting from the onflow of the air-oil volume flow and from the outflow of the oil out of the outlet area 35 or the holes 44 are preferably matched to one another such that bearing forces acting in the area of the pivot bearing 42 are minimum.

The holes 44 of the further element 40 are connected in the present invention to the oil guide duct 39 via the further oil guide duct 41 extending substantially in the flow direction X of the air-oil volume flow and via an additional oil duct 45 also running inside the further element 40 in the radial direction of the flow cross-section 34, and also to one another via the additional oil duct 45.

Depending on the specific application, the device 29 of the jet engine 1 is designed with only one or with several areas at a distance from one another in the flow direction X of the air-oil volume flow in accordance with FIG. 6 to FIG. 9 for spraying oil into one or more air-oil volume flows in the jet engine 1, in order to achieve a high separation capacity, as required, in the area of the oil separator 17.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
16A Inner gearbox
17 Oil separator
18 Oil tank
19 Component
20 Area, front bearing chamber
21 Area, rear bearing chamber
22 Line section
23 Pre-chamber
24 Interior
25 Casing
26 Porous area
27 Gear
27A to 27E Gear
28 Environment
29 Device
30 Line section node
31 Further line section
32 Gear shaft
33 Wall area
34 Flow cross-section
35 Outlet area
36 Hole
37 Feed area
38 Element
39 Oil guide duct
40 Further element
40A, 40B Partial arm area
40A1, 40B1 Slope
41 Further oil guide duct
42 Pivot bearing
43 Sliding bush
44 Hole
45 Additional oil duct
R Sense of rotation
X Main flow direction of air-oil volume flow
α Acute angle

The invention claimed is:

1. A jet engine comprising:
a wall area forming a flow cross-section;
an outlet area movable relative to the wall area;
a spraying device for injecting a spray of oil into an air-oil volume flow guided inside the flow cross-section,
a separate oil supply separate from the air-oil volume flow for supplying oil to the spraying device;
an oil separator;

the air-oil volume flow being guided through the oil separator to separate the oil from the air-oil volume, the spraying device being positioned to inject a spray of oil from the separate oil supply into the air-oil volume flow in an area of the spraying device via the outlet area movable relative to the wall area.

2. The jet engine in accordance with claim 1, wherein the wall area include a feed area connected to the separate oil supply and an outlet area supplied with oil from the separate oil supply via a hole of the feed area passing through the wall area substantially in a radial direction.

3. The jet engine in accordance with claim 2, wherein the feed area includes an element projecting in the radial direction from the wall area into the flow cross-section of the air-oil volume flow and containing an oil guide duct connected to the hole.

4. The jet engine in accordance with claim 3, wherein the feed area includes a further element rotatably connected to the projecting element and a further oil guide duct positioned internally of the further element and connected to the oil guide duct.

5. The jet engine in accordance with claim 4, and further comprising a pivot bearing provided between the projecting element and the further element.

6. The jet engine in accordance with claim 5, wherein the pivot bearing is a plain bearing.

7. The jet engine in accordance with claim 4, wherein the further element extends in the radial direction in the flow cross-section of the air-oil volume flow and includes, in an area of a side facing away from a flow direction of the air-oil volume flow, with a hole of the outlet area, the hole issuing into the flow cross-section of the air-oil volume flow.

8. The jet engine in accordance with claim 7, and further comprising a nozzle device provided in an opening area of the hole of the outlet area, the nozzle device converting the oil from the separate oil supply into a mist.

9. The jet engine in accordance with claim 7, wherein the outlet area includes several holes, at a distance from one another in the radial direction, each hole issuing into the flow cross-section.

10. The jet engine in accordance with claim 9, wherein the holes of the further element are connected to one another via the oil guide duct.

11. The jet engine in accordance with claim 4, wherein a surface of the further element facing the air-oil volume flow relative to the flow direction of the air-oil volume flow includes a sloped surface by which energy of the air-oil volume flow can be transformed into a mechanical drive energy causing a rotary movement of the further element.

12. The jet engine in accordance with claim 4, wherein the further element is rotatably connected to the projecting element substantially in a center of the flow cross-section of the air-oil volume flow and includes, starting at the rotary connection to the projecting element, partial arm areas, each extending radially in a direction of the wall area limiting the flow cross-section.

13. The jet engine in accordance with claim 12, wherein the partial arm areas each include a slope with each slope being mirror-inverted to one another.

14. The jet engine in accordance with claim 1, wherein the oil injectable out of the outlet area into the air-oil volume flow is imparted with a flow direction in the outlet area, the flow direction forming an acute angle with the main flow direction of the air-oil volume flow in the area of the device.

15. The jet engine in accordance with claim 1, wherein the device includes in a flow direction of the air-oil volume flow several areas for injecting in oil spaced at a distance from one another.

* * * * *